United States Patent Office 2,857,863
Patented Oct. 28, 1958

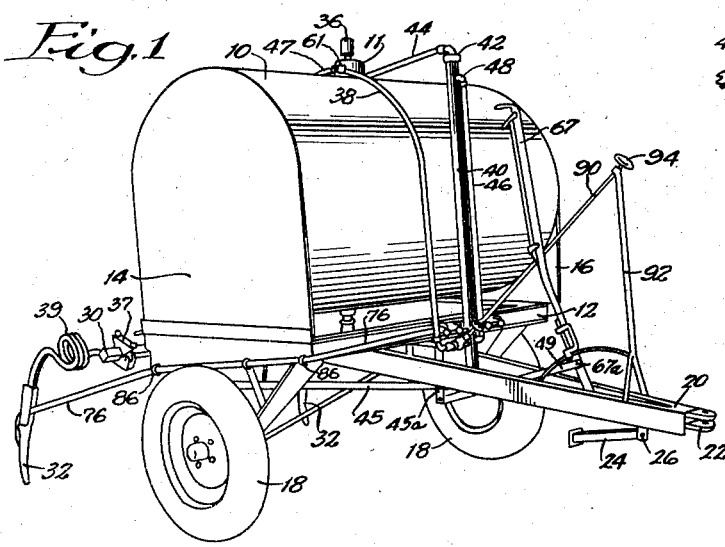

2,857,863

NITROGEN FERTILIZER DISPENSER

Frank Jessen, Everly, Iowa

Application March 28, 1955, Serial No. 497,108

2 Claims. (Cl. 111—7)

This invention relates to an apparatus for injecting fluid fertilizer into the soil. Such an apparatus has a plurality of cultivator teeth for digging into the soil and a delivery tube fixed to each tooth for discharging the fluid into the furrow thus dug beneath the ground surface. The invention is characterized by an efficient apparatus which is economical to build, and capable of supplying fertilizer in liquid or gaseous form to the soil at a uniform rate. In one form of the invention, the flow paths from the fertilizer reservoir to the injectors are completely devoid of valves, except one for shut-off purposes. The elimination of valves in each of the distribution lines obviates the harassing problem of plugging of the lines due to corrosion and foreign material which often accumulates in the valves to render the apparatus inoperative, or at least highly inefficient.

The apparatus generally consists of a large storage tank mounted on a suitable two-wheeled trailer frame, adapted to be pulled by a tractor, the tank serving as the reservoir for liquid fertilizer such as nitrogen, anhydrous ammonia, or the like. A stand pipe mounted on the frame connects at its lower end to the bottom of the storage tank through a valved conduit. A plurality of delivery tubes, one for each ground-working tool affixed to the rear end of the trailer, connect to the stand pipe through nipples or branch lines extending from the stand pipe near the lower end thereof. This arrangement insures constant and uniform flow through each of the delivery tubes into the soil, regardless of the quantity, condition, or location of the fluid in the tank.

It is, therefore, one object of the invention to provide an apparatus in which the fluid fertilizer flows to the distribution tubes from a stand pipe, thus eliminating unequal pressure between the several tubes which supply the fertilizer to the earth.

Another object is to provide for the distribution of fluid fertilizer from a stand pipe having a plurality of openings of different diameters near the lower end thereof, the smaller diameter openings being adapted for supplying fluid fertilizer to the distribution tubes when the outside temperature of the air surrounding the tank is low, and the larger diameter openings supplying fluid to the distribution tubes when the outside temperature surrounding the tank is high. The size of the openings is governed by the amount of fluid fertilizer desired to be distributed as well as the outside temperature of the air surrounding the tank. The pressure, of course, will vary with the head of liquid and the vapor pressure, which in turn is dependent on the ambient temperature. This means for distributing the fertilizer to the distribution tubes eliminates the necessity for valves, which have been found to plug rather quickly because of corrosive action of liquid fertilizer, particularly when using liquid nitrogen as such fertilizer.

Another object is to provide means for circulating liquid fertilizer through the lower end of the stand pipe to prevent the outlet nipples from being plugged when they are not connected to the distribution tubes.

A further object is to provide a trailer apparatus of the type described in which the flow of fertilizer through the delivery tubes and the disposition of the cultivator teeth may be controlled by the operator seated on the tractor pulling the apparatus.

These and other objects will become apparent from the following description when read in conjunction with the accompanying drawings, in which:

Figure 1 is a perspective view of the apparatus of the invention;

Figure 2 is an enlarged perspective view of the stand pipe showing the piping connections between the lower end thereof and the supply tank and the feed means for supplying the liquid fertilizer to the distribution tubes;

Figure 3 is a perspective view of the stand pipe used in my apparatus in which an alternative means for supplying fertilizer to the distribution tubes is illustrated; and Figure 4 is a fragmentary side view, partly in section, of the rear end of the apparatus, showing the cultivator tooth and method of mounting on the frame.

Referring now to the drawings, the apparatus comprises a large generally elongated tank 10 which is mounted transversely on the channel iron frame 12 of a two-wheel trailer by means of supporting side plates 14 and 16 mounted on the frame just inside the wheels of the trailer. The tank preferably is welded to the plates. The trailer has conventional pneumatic tires 18 to permit the tank to be pulled by a tractor or other vehicle over rough or smooth terrain without difficulty. A tongue or draw bar 20 extends forwardly from the main frame 12 for connecting the trailer through a suitable hitch 22 to a complementary hitch on the tractor. A standard 24 is pivotally connected to an ear 26 depending from the outer end of the draw bar 20 to support the draw bar above the ground when the trailer is not attached to a tractor.

Mounted parallel with the axle at the rear of the trailer is a square bar 30 on which are mounted a plurality of earth digging teeth or fingers 32 which are adapted to burrow into the earth and insure uniform distribution of fertilizer beneath the surface. As shown in Figure 4, the bar 30 is pivotally supported near each end on a pair of arms 31 adapted to swing about pins 35, which extend through brackets 33. The brackets are fixed to the rear member of the frame 12, as by welding. The teeth proper are fixed to the lower end of spring rods 39, the upper ends of which are secured to clamps 37. The clamps 37 may be of any suitable construction which detachably secures the rods 39 to the bar 30 and prevents rotation with respect thereto. Rotation of the bar 30 may be conveniently accomplished by means of the lever 67, the lower end of which is pivotally mounted on the draw bar 20. As shown in Figure 1, arm 49, pivotally connected at 67a to lever 67 just above its lower end, connects to the actuator member 45 through a suitable linkage 45a. The upper portion of the linkage is not shown in the drawing. The outer end of member 45 is pivotally connected at 43 to the lower end of arm 41, which has its upper end welded to the bar 30, as best shown in Figure 4. The location of the lever 67 permits an operator seated on the tractor pulling the apparatus to actuate the teeth 32 into ground engaging position by rotating the bar 30 about the pins 35.

The tank 10 has an expansion dome 11 extending upwardly from the top thereof to which several connections are made. On the top of the dome 11 is mounted a pop-off valve 36 which is adapted to release excess pressure in the event that it is built up rapidly due to expansion of the liquid fertilizer. The valve 36 may be removed to facilitate filling the tank. Connected to the side of the dome 11 is a pair of flexible tubes 38 and 47. Tube 38 leads to the supply line 58 between the bottom of the tank 10 and the stand pipe, as will appear hereinafter. Flexible tube 47 extends downwardly over the rear of the tank to the ground and serves as a vent and also to direct condensed gaseous nitrogen escaping from the tank to the ground where it will be used. When the apparatus is not in use, the tube 47 may be pushed onto the stud or peg 49 fixed to the rear channel member of frame 12 (see Figure 4).

A large diameter stand pipe 40 is secured as by welding to the front channel member of the trailer frame 12 by means of brackets, not shown. The stand pipe is best shown in Figure 2. The lower and upper ends of the stand pipe are equipped with caps 51 and 42 which are removable for purposes of cleaning. The stand pipe is vented by means of a flexible tube 44 which connects to the interior of the stand pipe 40 through an opening in the top cap 42. The tube 44 extends over the rear of the supply tank 10 and dangles on the surface of the ground when the apparatus is in operation to utilize any condensed gaseous nitrogen that might be escaping from the stand pipe. When not in use the end of tube 44 may be slipped over a peg or stud 49 in similar manner to the tube 47 mentioned above. To permit the operator to observe the liquid level in the tank 10 and stand pipe 40, a sight glass 46 is mounted on elbows 48 and 50 near the upper and lower ends of the stand pipe. Fluid fertilizer may flow by gravity from the bottom of the tank 10 into the reducer T 54, one branch of which is equipped with a capped nipple 56 to serve as a clean-out or drain and the other branch of which is suitably reduced to the size of the pipe 58 leading to the stand pipe. The pipe 58 terminates in a T 60, one branch of which connects to the flexible vent tube 38 for preventing vapor lock in the line 58. The other branch of the T connects to line 62, which contains a valve 64 and terminates in the connection 66 to the lower end of the stand pipe. The flow of fluid from the tank 10 thus follows the course through the reducing T 54, line 58 and line 62. Just above the connection 66 a pair of headers 68 and 70 extend laterally outward from the stand pipe to provide suitable connections to the distribution tubes through which the fertilizer is conducted to the earth. The headers 68 and 70 may contain any number of branch lines, but in the drawing I have shown two connecting to each. The number, of course, depends upon the number of distribution tubes employed which in turn is determined by the size of the apparatus. The header 68 has two valved lines 72 and 74 extending therefrom, the outer ends of which are secured to distribution tubes 76 and 78 by means of hose clamps 80. The header 70 contains similar branch lines which are also valved and connect to distribution tubes 82 and 84. The outside tubes 76 and 84 are disposed around the frame of the trailer and held in position by means of semi-circular guides 86 secured to the frame 12, Figure 1. The tubes extend outwardly from the rear of the trailer frame and are secured to the teeth 32. Preferably, each tube runs down behind the tooth, which may be V-shaped in cross section, and adapted to receive the tube and protect it from earth which is being plowed. The flexible tubes may terminate in a short length of straight tubing 75 (Figure 4) which extends to the lower end of the tooth 32. The tubes 78 and 82 connect in similar manner to their corresponding teeth, which are not shown in Figure 1.

An extension rod 90, having its upper end mounted on support 92 fixed to the draw bar 20, terminates in a fork adapted to engage the valve 64, and has a metering wheel 94 on its upper end for actuating the valve from the driver's seat of the tractor.

In operation, the tank 10 is filled with the fluid fertilizer, which flows by gravity through the T connection 54, line 58 and line 62 into the stand pipe 40. The valve 64, controlled by the metering wheel 94, is opened to the extent necessary to equalize the pressure necessary on the distribution tubes. The level of the liquid in the stand pipe is kept constant by the opening or closing of the valve 64 through the metering wheel 94, but the level of the liquid in the stand pipe is not necessarily always the same level as the level of the liquid in the tank 10. However, because the stand pipe is of relatively large diameter the combination of pressure and gravity which forces the liquid through the distribution tubes 76, 78, 82 and 84 is relatively constant and varies only as to the height of the liquid head and the outside air temperature. In other words, surges within the large tank 10 in no way affect the quantity of fluid fertilizer discharged from the distribution tubes, the motivating force for distribution being gravity, and liquid pressure head remains constant through the use of control valve 64 as controlled by metered wheel 94 so that the tube 76, for example, receives and discharges liquid fertilizer in the same volume and under the same forces of gravity as are applied to tubes 82, 84 or 78. The valves 71, 73 in the branch lines serve to regulate the rate at which the fluid flows through the distribution tubes into the ground. The tank is vented through line 47 so that air may replace the liquid discharged from the tank. To bleed off any vapor which might be trapped in the lines 58 or 62, the connection 61 is provided for tube 38 through the dome 11 to the interior of the tank 10. Thus, constant measured quantities of fluid fertilizer are supplied in equal volume to each of the distribution tubes.

The teeth 32 are lowered into ground engaging position by the tractor operator by actuating the lever 67. As the trailer is pulled by the tractor the teeth dig into the ground and loosen the soil to the depth desired. The fertilizer flows out of the end of the rigid tube 75 and permeates the churned-up soil in which it is absorbed.

In Figure 3 I have shown an alternative form of stand pipe construction and distribution means which does not utilize valves. Consequently, this construction is comparatively simple and inexpensive to build. It does not provide full control of volume to the distribution tubes as do valves, but except for this point the system of Figure 3 is preferred. The lines 58 and 62, which contain the valve 64 and the vent line 38, are identical to the structure described in connection with Figure 2. However, the headers have been completely eliminated and instead I have substituted rows of circumferentially-spaced openings, each row being vertically spaced from each other and located just above the point where the line 62 connects to the stand pipe 40. The highest row of openings is below the bottom of the tank 10. These openings have nipples 100, 102 and 104 extending outwardly therefrom. Connections may be made through flexible tubes from the nipples in the same row to the distribution points behind the shoes 32. As shown in Figure 3, only two distribution tubes 106 and 108 are employed, which connect to opposed nipples 102. The opposite ends of tubes 106 and 108 connect to the teeth 32. The nipples 104 are of smaller diameter than the nipples 102 and the nipples 100 are of larger diameter than the nipples 102. When the ambient temperature is high, say above 90° F., and the pressure in the tank is correspondingly high, the distribution tubes 106, 108 are connected to the small diameter nipples 104 in place of the tube 112. On the other hand, if the temperature is low, say in the vicinity of 60° F. to 70° F., the larger sized nipples 102 are employed as shown in Figure 3. By regulating the size of the nipple orifices through which the fluid fertilizer flows to the distribution tubes, it is possible to compensate for variation in pressure which is caused by a rise or a fall in the ambient temperature. The largest orifices in nipples 100 are generally used when the temperature is high and the liquid head is low, although any combination of orifices may be used to distribute the liquid fertilizer in the manner best suited to accomplish the desires of the operator. Although two nipples in each circumferential row are shown in the drawing in Figure 3, it will be apparent that any number may be spaced circumferentially about the stand pipe 40, in accordance with the number of teeth 32.

One important advantage in the construction of the unit of Figure 3 lies in the fact that when not in use as distribution spigots, the nipples 100, 102 and 104 may be joined to each other by means of lengths of hose, designated in the drawing by the numerals 110, 112. This insures constant circulation of fluid through the nipples so that there is no plugging when they are not being used for distributing fertilizer to the ground through the distribution tubes.

The flexible tubing used in the construction of this apparatus may be made of fabric-reinforced rubber or plastic or it may be made of transparent plastic which is not reinforced. The transparent tubing is desirable in that it permits the operator to observe the flow and locate any stoppages. The plastic or rubber compound should, of course, be chemically resistant to the fluid fertilizer that will be used.

From the foregoing description it is apparent that I have provided a novel apparatus which operates on the gravity principle, thus eliminating the need for employing costly pumps or other mechanical circulation devices which are always a source of trouble from the fouling standpoint. Gravity is aided to some extent in the flow through the system by the vapor pressure of the liquid nitrogen which is constantly vaporizing, especially at elevated temperatures.

Although I have described my invention with reference to specific forms, it will be understood that it is susceptible of various modifications without departing from the true scope and spirit of the invention. It is, therefore, my intention not to limit the invention other than as necessitated by the scope of the appended claims.

What I claim as new and desire to secure by Letters Patent of the United States is:

1. An apparatus for injecting volatile liquid fertilizer into the soil which comprises a wheeled frame, soil-engaging teeth secured to the rear of said frame, a storage tank mounted on said frame, a vent for said tank, a vented upright stand pipe of relatively large diameter being vented through a reduced outlet at the top thereof, said stand pipe being mounted on said frame adjacent said tank and extending below the bottom of said tank, said stand pipe having a plurality of circumferentially-spaced openings therein of reduced dimension relative to the diameter of the stand pipe, said openings being arranged in vertically-spaced rows near the lower end thereof below the bottom of said tank, the diameter of the openings in each row being larger than that of openings in the row above, a plurality of fertilizer distribution tubes each having one end connected to openings in the same row and the other end connected to said soil-engaging teeth, means preventing discharge of fertilizer through the other openings, means selectively controlling the discharge of fertilizer through said fertilizer distribution tubes, and a conduit connecting the bottom of said tank to the lower end of said stand pipe, whereby said fertilizer may be discharged into the soil from each of said tubes.

2. An apparatus for injecting volatile liquid fertilizer into the soil which comprises a wheeled frame, soil-engaging teeth secured to the rear of said frame, a storage tank mounted on said frame, a vent for said tank, a vented upright stand pipe of relatively large diameter being vented through a reduced outlet at the top thereof, said stand pipe being mounted on said frame adjacent said tank and extending below the bottom of said tank, said stand pipe having a plurality of circumferentially-spaced openings therein of reduced dimension relative to the diameter of the stand pipe, said openings being arranged in vertically-spaced rows near the lower end thereof below the bottom of said tank, the diameter of the openings in each row being larger than that of openings in the row above, a plurality of fertilizer distribution tubes each having one end connected to openings in the same row and the other end connected to said soil-engaging teeth, the openings not connected to said distribution tubes being interconnected with short flexible conduits to permit flow through said openings to keep them clear, means selectively controlling the discharge of fertilizer through said fertilizer distribution tubes, and a conduit connecting the bottom of said tank to the lower end of said stand pipe, whereby said fertilizer may be discharged into the soil from each of said tubes.

References Cited in the file of this patent

UNITED STATES PATENTS

| | | |
|---|---|---|
| 409,973 | Johnson | Aug. 17, 1889 |
| 1,569,644 | Taylor | Jan. 12, 1926 |
| 2,012,973 | Parker | Sept. 3, 1935 |
| 2,285,932 | Leavitt | June 9, 1942 |
| 2,632,373 | Silver | Mar. 24, 1953 |
| 2,794,407 | Wist et al. | June 4, 1957 |

OTHER REFERENCES

Publication: Application of Anhydrous Ammonia Fertilizer, Agricultural Engineering Journal, November 1954, pages 801–803 and 807.